United States Patent [19]
Ege et al.

[11] Patent Number: 5,550,449
[45] Date of Patent: Aug. 27, 1996

[54] PROCESS FOR DRIVING ELECTRIC, CURRENT-CONTROLLED ACTUATORS

[75] Inventors: Hans-Jürgen Ege, Ravensburg; Günther Horsak, Friedrichshafen; Peter Wiggermann, Langenargen, all of Germany

[73] Assignee: ZF Friedrichshafen AG, Friedrichshafen, Germany

[21] Appl. No.: 341,601

[22] PCT Filed: Jun. 4, 1993

[86] PCT No.: PCT/EP93/01421

§ 371 Date: Feb. 17, 1995

§ 102(e) Date: Feb. 17, 1995

[87] PCT Pub. No.: WO93/25946

PCT Pub. Date: Dec. 23, 1993

[30] Foreign Application Priority Data

Jun. 6, 1992 [DE] Germany ............... 42 18 782.6

[51] Int. Cl.⁶ ................................. G05D 23/275
[52] U.S. Cl. ..................... 318/632; 318/501; 318/66; 364/483
[58] Field of Search ............ 318/632, 64, 254, 318/138, 567, 66, 59, 68, 687, 600, 601; 310/361; 364/483, 481, 568, 193, 565

[56] References Cited

U.S. PATENT DOCUMENTS

| | | | |
|---|---|---|---|
| 4,547,858 | 10/1988 | Horak | 318/568.11 |
| 5,097,171 | 3/1992 | Matsunaga et al. | 310/316 |
| 5,179,330 | 1/1993 | Nikolaus | 318/567 |
| 5,343,078 | 8/1994 | Bullmer | 364/481 |
| 5,350,983 | 9/1994 | Miller | 318/254 |
| 5,400,872 | 3/1995 | Skalski et al. | 187/393 |

FOREIGN PATENT DOCUMENTS

| | | |
|---|---|---|
| 0294918 | 12/1988 | European Pat. Off. . |
| 3931962 | 4/1991 | Germany . |

OTHER PUBLICATIONS

Automotive Engineering, vol. 93. No. 3, Mar. 1984, p. 79.
VDI News No. 38, Sep. 8, 1981, p. 16.
VDI Reports No. 418, p. 186.

*Primary Examiner*—John W. Cabeca
*Attorney, Agent, or Firm*—Davis, Bujold & Streck, P.A.

[57] ABSTRACT

The process has an open control loop which detects the total current intensity of actuators and supplies it to a microprocessor. In a modulation mode the microprocessor successively generates at its output a modulated set value signal for each actuator, the set value signals lying below the response level of the process. The microprocessor then determines compensation values from the total current signal with which the set values of the actuators are corrected. The (regulating) speed of a control is thus combined with the accuracy of a regulation. The hardware expenditure (costs) is minimized thanks to the total current detection instead of the individual current detection.

2 Claims, 1 Drawing Sheet

PROCESS FOR DRIVING ELECTRIC, CURRENT-CONTROLLED ACTUATORS

The invention relates to a process for driving electric, current-controlled actuators. Electric, current-controlled actuators such as proportional valves, the current intensity of which is regulated in an open or closed control loop according to influencing factors relevant to the process are being increasingly used in vehicle technology. Such control loops are known from multiple sources, for instance, VDI News No. 38, Sep. 8, 1981, page 16; or VDI Reports No. 418, 1981, page 186, VDI-Verlag GmbH, Heinrich Strasse 24, 40239 Dusseldorf; or Automotive Engineering, 1984, page 79.

In closed control loops, a set value quantity for the current intensity is determined and issued, by means of a microprocessor, from influencing factors for effecting an adjustment of the actuators, and is compared with the actual value of the current intensity of the actuator. The regulated quantity is increased or reduced according to the difference between the set value and the actual value. Current-measuring devices corresponding to the number of actuators are needed to detect the intensity of the current in each actuator. A relatively powerful microprocessor is required for processing the data. The time constant of such control loops decisively depends on the efficiency of the microprocessor used.

Control processes where the actual value of the current intensity is not measured and compared with the set value work more quickly. But, as a rule, those controls are not accurate enough, since they do not sufficiently take into consideration interference levels which affect the actuators and the influencing factors relevant to the process. It is known to separately detect the most important interference levels and compensate the effect thereof by adequate programs. But this is very costly when numerous interference levels and actuators have to be taken into consideration. Besides, not all of the interference levels are directly detectable.

The problem to be solved by the invention is to provide a process for driving electric, current-controlled actuators, which ensures a quick and accurate driving of the actuators at low cost.

The problem is solved by a process according to the preamble of the claim and by the characteristic part thereof.

The process according to the invention is an open-control process where the set values for the current intensities of the individual actuators is conventionally determined and issued by a microprocessor in accordance with influencing factors relevant to the process. However, current intensities are not individually detected, instead, only the joint influence thereof upon the current intensity of the actuators is detected. For this purpose, in the time intervals in which no adjustment signals in the form of influencing factors are provided by the inputs of the microprocessor, a program is activated for determining correction factors (modulation program) according to which output signal (modulation), which lie below the response level of the process, are separately and successively generated for each actuator. The current of the actuators is simultaneously measured and from the current signals compensation values are detected and temporarily stored. As soon as adjustment signals relevant to the process are provided as input to the microprocessor, they are processed together with the last stored compensation values, and issued as set values for the individual actuators.

The cost for such a process is especially small when, according to an embodiment of the invention, the total current of several or all of the actuators is detected with a single current-measuring device and, in the modulation mode, the microprocessor successively issues the modulation values for the individual actuators. Since the set values are modulated for one actuator at a time during the modulation program and the set values for the remaining actuators are constant, it is possible at different times, to determine the effect of the interference levels upon the individual actuators from the total current signal.

The invention is explained with the aid of the drawings. In the drawings.

Figure 1:
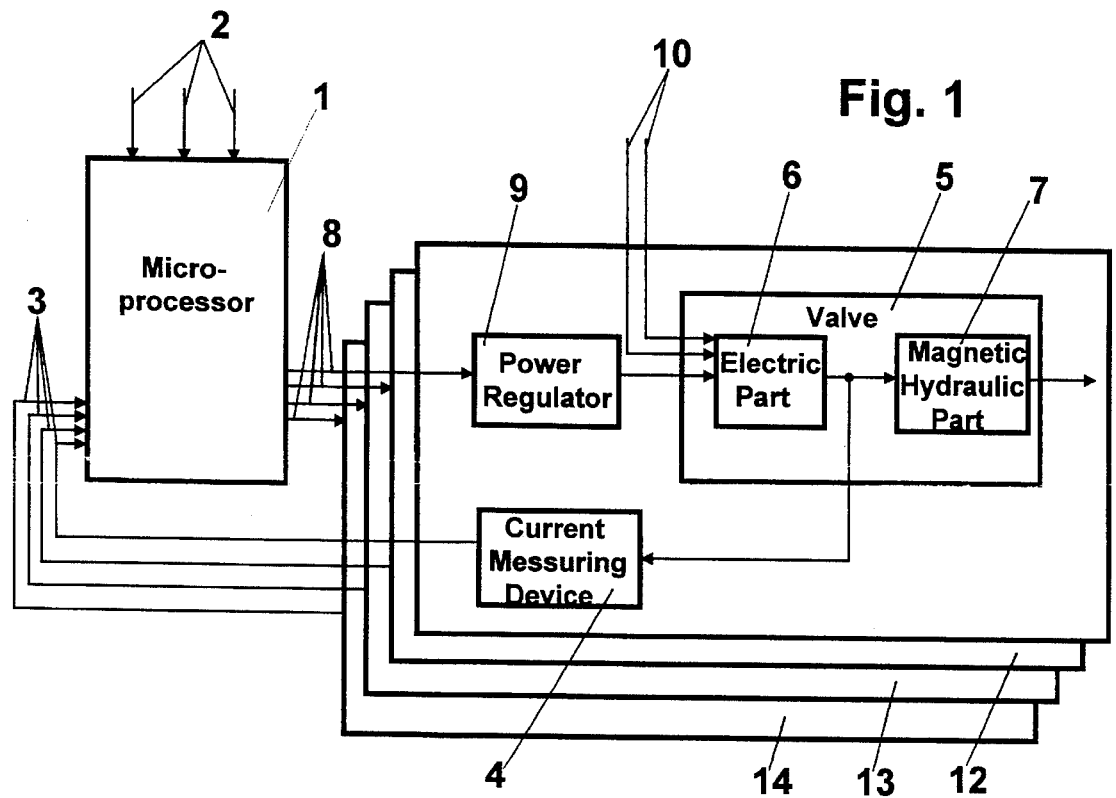
FIG. 1 shows an embodiment with several current-measuring devices.

A microprocessor, designated with 1, comprises memories for data relevant to the process, performance characteristics and flow programs and inputs 2 for receiving influencing factors relevant to the process which are to effect an adjustment of the actuators. The influencing factors are herebelow designated as adjusting signals. Inputs 3 are additionally provided for receiving current signals generated by current-measuring devices 4. The latter measures the current intensity of electric current-controlled actuators in the form of electromagnetic proportional valves 5 which have an electric part 6 and a magnetic-hydraulic part 7.

Depending on the adjusting signals, the microprocessor 1, with the aid of the stored data and programs, determines set values for the current intensities of the electric part 6 of the proportional valve 5, said set values being corrected by compensation values which the microprocessor 1 has derived from the current signals of the measuring devices 4 and temporarily stored. The set value signals are sent out as outputs 8 of the microprocessor 1 and, via a power regulator 9, produce a corresponding current intensity in the electric parts 6 of the proportional valve 5.

Only one of each of the actuators and proportional valves 5 is shown, others (three in the example) are indicated by successive layers 12 to 14.

Interference levels 10, such as the supply voltage, the temperature, etc., act upon the control process. The interference levels 10 influence the current intensity in the electric part 6 of the proportional valve 5. To determine said influence and process it to determine compensation values, a modulation program is activated during the time periods in which no adjusting signals are provided by the inputs 2, so that modulated set value signals, lying below the response level of the process, for the individual proportional valves 5 occur at the outputs 8. From the current signals determined from said value factors, the total effect of the interference levels can be deduced and an adequate compensation value found. If adjusting signals are provided by the inputs 2, the modulation mode is discontinued and the last stored compensation values are used to determine the set values to be formed again.

Figure 2:
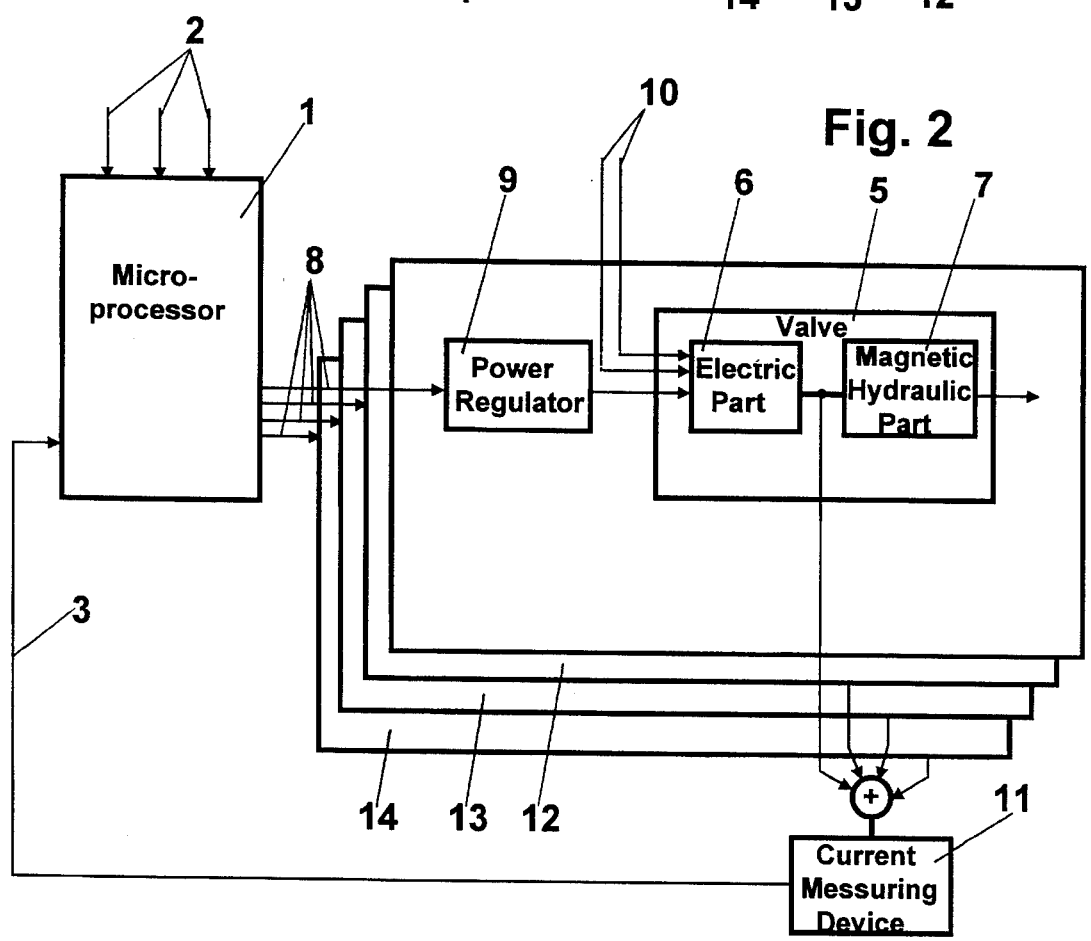
FIG. 2 shows an embodiment with a single measuring device for detecting the current intensity.

The embodiment of FIG. 2 differs from the embodiment of FIG. 1 by there being provided, instead of a current-measuring device 4 for each proportional valve 5, a single current-measuring device 11 which measures the total current of all (four in the example) proportional valves 5 and feeds it to the microprocessor 1. In the modulation mode, the latter modulates the set values for each proportional valve separately and in succession and thus finds the compensation values for the individual proportional valves 5 from the total current.

| Reference numerals | |
| --- | --- |
| 1 microprocessor | 8 output |
| 2 input | 9 power regulator |
| 3 input | 10 interference levels |
| 4 current-measuring device | 11 current-measuring device |
| 5 proportional valve | 12 table |
| 6 electric part | 13 table |
| 7 magnetic-hydraulic part | 14 table |

We claim:

1. A process for driving electric current-controlled actuators (5) using a microprocessor (1) having at least one memory for storing data, performance characteristics and flow programs relevant to said process; said process comprising the steps of:

inputting at least one of an adjusting signal (2) and a current signal (3) to said microprocessor (1) to be processed according to logical rules;

issuing modulated set values for said actuators, during intermediate time periods between sequential inputs of said adjusting signals to said microprocessor (1) in accordance with a modulation program, said modulated set values being below a response level for said actuators;

measuring current intensities of said actuators (5), from said current signal input to said microprocessor, to determine interference levels;

determining, using said modulation program, compensation values due to current changes caused by said interference levels;

storing said compensation values temporarily in said at least one memory; and issuing set values for said actuators upon inputting a further said adjusting signal to said microprocessor, said set values being adjusted by a last of said stored compensation values.

2. A process according to claim 1, further comprising the steps of:

detecting a total current of at least one of said actuators with a single current measuring device;

determining, by said microprocessor using said modulation program, a said compensation value corresponding to each of said actuators; and adjusting said set values for each said actuator with said determined corresponding compensation value.

* * * * *